United States Patent [19]

Altermatt

[11] 3,935,208

[45] Jan. 27, 1976

[54] TRIAZINYL VAT DYESTUFFS

[75] Inventor: Hans Altermatt, Reinach, Switzerland

[73] Assignee: Ciba-Geigy Corporation, Ardsley, N.Y.

[22] Filed: Jan. 21, 1974

[21] Appl. No.: 435,062

[30] Foreign Application Priority Data

Jan. 30, 1973 Switzerland.......................... 1327/73

[52] U.S. Cl. .......................... 260/249; 8/54.2; 8/36; 8/21 C
[51] Int. Cl.² ....................................... C07D 251/48
[58] Field of Search ..................................... 260/249

[56] References Cited
UNITED STATES PATENTS 3,110,710  11/1963  Rattee et al. ................... 260/249 X
3,639,430  2/1972  Altermatt............................ 260/249

Primary Examiner—John M. Ford
Attorney, Agent, or Firm—Joseph G. Kolodny; Prabodh I. Almaula; Edward McC. Roberts

[57] ABSTRACT

Vat dyestuffs of the formula

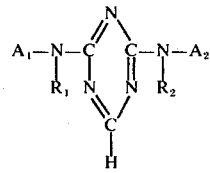

wherein $R_1$ and $R_2$ each represent a hydrogen atom or a low molecular alkyl radical and $A_1$ and $A_2$ represent a different or similar vattable radical with 3 to 6 condensed rings, are suitable for dyeing and printing the most varied materials, in particular for dyeing and printing fibres made from natural or regenerated cellulose in the presence of a reducing agent.

3 Claims, No Drawings

TRIAZINYL VAT DYESTUFFS

The present invention provides new vat dyestuffs of the general formula

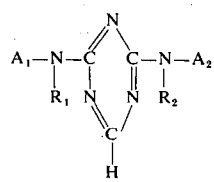

wherein $R_1$ and $R_2$ each represent a hydrogen atom or a low molecular alkyl radical, and $A_1$ and $A_2$ represent a different or similar vattable radical with 3 to 6 condensed rings. Possible radicals $R_1$ and $R_2$ are alkyl groups with 1 to 4 carbon atoms, e.g. methyl, ethyl, propyl or isopropyl groups, as well as preferably hydrogen atoms.

Possible vattable radicals $A_1$ and $A_2$ are radicals of polycyclic compounds such as anthrapyramidines, anthrapyridones, anthrapyrimidones, azabenzanthrones, benzanthrones, anthranthrones, anthrimides, isothiazole-anthrones, pyrazole-anthrones, pyrimidanthrones, anthraquinone compounds which are derived from 9,10-dioxoanthracene and optionally contain further fused carbocyclic and heterocyclic rings, such as quinazolineanthraquinones, oxazoleanthraquinones, thiazole-anthraquinones, oxadiazole-anthraquinones, pyrazole-anthraquinones, pyrazino-anthraquinones, and, preferably, 3,4-phthaloylacridones bonded in 2- or 8-position as well as radicals of anthraquinones bonded in 1- or 2-position. All these radicals can carry the customary substitutents for vat dyestuffs. Examples of such substituents are: halogen atoms, in particular chlorine, fluorine, or bromine, alkyl, alkoxy, aryl, aryloxy, aralkyl, aralkoxy, arylamino, alkylmercapto, arylmercapto, cyano and thiocyano groups. Throughout this specification, the term "alkyl" refers in particular to radicals with 1 to 4 carbon atoms, and "aryl" denotes in particular radicals such as phenyl, tolyl, chlorophenyl, methoxyphenyl, or naphthyl radicals, and "aralkyl" means in particular the benzyl radical. Particularly important substituents are moreover the acyl and acylamino group. The term "acyl" comprises above all radicals of aromatic carboxylic or sulphonic acids, in particular those of the benzene series, or low molecular alkanoyl or alkylsulphonyl radicals (i.e. which contain from 1 to 4 carbon atoms), e.g. the acetyl, benzoyl, p-chlorobenzoyl, p-phenylbenzoyl, benzenesulphonyl or p-toluenesulphonyl radical, also low molecular carbalkoxy radicals and sulphonamide or carboxy amide groups the nitrogen atom of which can be substituted by alkyl or aryl radicals, e.g. the carboethoxy, carbamoyl or sulphamoyl radical.

Preferred dyestuffs are those of the general formula

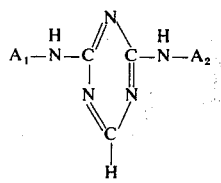

wherein $A_1$ and $A_2$ represent an anthraquinone radical bonded in 1- or 2-position or a 3,4-phthaloylacridone radical bonded in 2- or 8-position, and $A_1$ and $A_2$ can carry the indicated substituents.

The dyestuffs are manufactured by reaction of 2 moles of a compound of the formula $$A_1 - Z_1$$

or $$A_2 - Z_2$$

or of a mixture of both, with a triazine of the formula

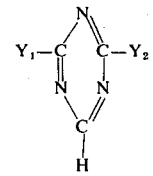

wherein either $Z_1$ and $Z_2$ represent a halogen atom and $Y_1$ and $Y_2$ represent radicals of the formula $—NHR_1$ and $—NHR_2$, or $Z_1$ and $Z_2$ represent radicals of the formula $—NHR_1$ and $—NHR_2$ and $Y_1$ and $Y_2$ represent halogen atoms. Bromine and, preferably, chlorine are suitable halogen atoms. Consequently, 2 moles of a compound of the formulae $A_1$-halogen or $A_2$-halogen, or any mixture of the two, are condensed with a compound of the general formula

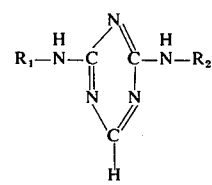

or 2 moles of a compound of the formula $A_1$—$NHR_1$ or $A_2$—$NHR_2$, or any mixture of the two, with 1 mole of the compound of the general formula

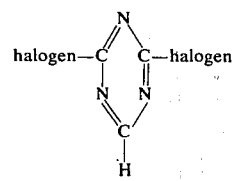

The mixture of the vattable compounds can be used simultaneously or stepwise. By means of such combinations it is possible to obtain mixed shades.

These methods of manufacture are widely known. If the first method is followed $A_1$-halogen, $A_2$-halogen and diaminotriazine, it is advantageous to use a CuI-pyridine catalyst as described in French Pat. No. 1 603 058 (Case 1-6247/E). In this case, examples of suitable materials $A_1$-halogen and $A_2$-halogen are haloanthraquinones, i.e. both α- and β-haloanthraquinones, for example:

1-chloroanthraquinone,
1,3-dichloroanthraquinone,
1,5-dichloroanthraquinone,
1,6-dichloroanthraquinone,
1,8-dichloroanthraquinone,
1-bromoanthraquinone,
1,5-dibromoanthraquinone,
1,8-dibromoanthraquinone,
2-chloroanthraquinone, 2,6-dichloroanthraquinone,
2,7-dichloroanthraquinone,
2-bromoanthraquinone,
2,6-dibromoanthraquinone,
2,7-dibromoanthraquinone,
1-chloro-5-acetylaminoanthraquinone,
1-chloro-4-benzoylaminoanthraquinone,
1-chloro-4-(p-chlorobenzoylamino)-anthraquinone,
1-bromo-4-benzoylaminoanthraquinone,
1-bromo-4-(4'-phenylbenzoylamino)-anthraquinone,
1-chloro-5-benzoylaminoanthraquinone,
1-chloro-5-(p-chlorobenzoylamino)-anthraquinone,
1-bromo-5-benzoylaminoanthraquinone,
1-chloro-2-methylanthraquinone,
1-chloro-4-methylanthraquinone,
1-chloro-4-methoxyanthraquinone,
1-bromo-2-methoxyanthraquinone,
1-bromo-4-methoxyanthraquinone,
1-chloro-3-acetyl-4-amino-anthraquinone,
1-chloro-4-anilido-anthraquinone,
1-chloro-4-phenylmercaptoanthraquinone,
1-chloro-5-phenylmercaptoanthraquinone,
2-chloro-3,4-phthaloylacridone,
2,5,7-trichloro-3,4,-phthaloylacridone,
bz-1-chlorobenzanthrone,
bz-1-bromobenzanthrone,
6-bz-1-dichlorobenzanthrone,
6-bz-1-dibromobenzanthrone,
dichloroanthanthrone,
dibromoanthanthrone
dibromobenzpyrenquinone,
tribromopyranthrone.

If dihalotriazines and compounds of the formula $A_1$—$NHR_1$ or $A_2$—$NHR_2$ are used as starting materials, then instead of the haloanthraquinones there are used by analogy the corresponding a$\alpha$-or $\beta$-aminoanthraquinones, for example:

1-aminoanthraquinone,
1-amino-4-methoxyanthraquinone,
1-amino-4-acetylaminoanthraquinone,
1-4-benzoylamino-anthraquinone,
1-amino-4-(p-toluolsulphonylamino)-anthraquinone,
1-amino-4-(p-chlorobenzoylamino)-anthraquinone,
1-amino-4-anilido-anthraquinone,
1-amino-4-[p-(N,N-dimethylsulphamido)-benzoylamino]anthraquinone,
1-amino-4-phenylmercapto-anthraquinone,
1-amino-4-(4'-phenyl-benzoylamino)-anthraquinone,
1-amino-4-chloroanthraquinone as well as the corresponding 1-aminoanthraquinones which are substituted in 5- or 8-position instead of in 4-position.

2-amino-anthraquinone,
1-amino-2-methyl-anthraquinone,
1-amino-3-chloro-anthraquinone,
1-amino-6,7-dichloro-anthraquinone,
1-amino-6-phenylmercapto-anthraquinone,
1-amino-7-phenylmercapto-anthraquinone,
1-amino-6-chloro-7-phenylmercapto-anthraquinone,
1-amino-7-chloro-6-phenylmercapto-anthraquinone,
1,4-diamino-2-acetyl-anthraquinone,
2-amino-3-chloro-anthraquinone,
2-amino-4-chloro-anthraquinone,
1-amino-2-chloro-anthraquinone,
1-amino-6-chloro-anthraquinone,
1-amino-3-chloro-6-methyl-anthraquinone,
1-amino-2-methyl-3-chloro-anthraquinone,
1-amino-7-chloro-anthraquinone,
2-amino-3,4-phthaloylacridone,
2-amino-6- or 7-chloro-3,4-phthaloylacridone,
2-amino-6-trifluoromethyl,3,4-phthaloylacridone,
2-amino-5,7-dichloro-3,4-phthaloylacridone,
2-amino-1,7-dichloro-3,4-phthaloylacridone,
8-amino-5-chloro-3,4-phthaloylacridone,
7-amino-1,2-benzo-5,6-phthaloylacridone,
aminoanthanthrone,
aminoisothiazolanthrone.

The products according to the invention are suitable for dyeing and printing the most varied materials, in particular for dyeing and printing fibres made from natural or regenerated cellulose in the presence of a reducing agent e.g. dithionite.

The dyeings which are obtained are characterised by outstanding levelling properties. The fastness properties are in general very good, in particul the fastness to light, water, chlorine, and to boiling soda. The new dyestuffs reserve polyester fibres well or stain them tone in tone, which makes them suitable for dyeing fibre blends in admixture with disperse dyestuffs.

The new dyestuffs can also be used as pigments. On account of their favourable properties, they can be used for the most diverse forms of pigment application, e.g. in finely divided form for colouring rayon and viscose, or cellulose ethers or esters, or polyamides or polyurethanes or polyesters in the spinning melt, as well as for the production of coloured lacquers or lake formers, solutions or products from acetyl cellulose, nitrocellulose, natural resins or artificial resins, such as polymerisation resins or condensation resins, e.g. aminoplasts, alkyl resins, phenolic plastics, polyolefins, such as polystyrene, polyvinyl chloride, polyethylene, polypropylen, polyacrylonitrile, rubber, casein, silicone and silicone resins. Furthermore, it is also possible to use them with advantage in the manufacture of coloured pencils, cosmetic preparations, or laminated sheets.

The following Examples illustrate the invention, the parts being parts by weight unless otherwise stated.

EXAMPLE 1

A solution of 1 part of copper (I) iodide in 2 parts of pyridine is added to a suspension consisting of 10 parts of 1-chloroanthraquinone, 2.22 parts of 2,4-diamino-s-triazine and 5.3 parts of sodium carbonate in 70 parts of nitrobenzene and the whole is stirred for 1 hour at 180°–185°C. After 4 hours, the mixture is cooled to 100°C and the yellow precipitate is filtered off. The residue is washed first with a small amount of nitrobenzene, then thoroughly with methanol and water. The filter cake is stirred for ½ hour at 90°C in 500 parts of 6% nitric acid. The yellow dyestuff is filtered off, washed neutral, and dried. The dyestuff, which is obtained in a yield of over 90%, has the formula

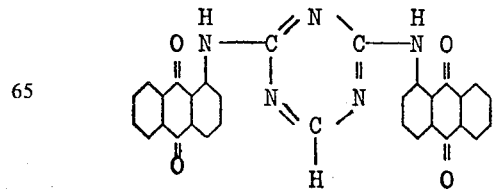

and dyes cotton from a hydrosulphite vat in yellow shades having good fastness properties.

EXAMPLE 2

By substituting for 10 parts of 1-chloroanthraquinone in Example 1 amount given in colum I of the following Table of the haloanthraquinones listed in column II, dyestuffs are obtained which dye cotton from the vat in the shades listed in column III.

TABLE II

| I | II | III |
|---|---|---|
| 11,2 | 1-bromoanthraquinone | yellow |
| 10,0 | 2-chloroanthraquinone | yellow |
| 15,1 | 1-chloro-4-benzoylamino-anthraquinone | red |
| 15,35 | 1-chloro-4-(p-chlorobenzoylamino)- '' | red |
| 15,1 | 1-chloro-5-benzoylamino-anthraquinone | golden-yellow |
| 15,35 | 1-chloro-5-(p-chlorobenzoylamino)- '' | golden-yellow |
| 10,6 | 1-chloro-4-methyl-anthraquinone | yellow |
| 11,2 | 1-chloro-4-methoxy-anthraquinone | orange |
| 12,4 | 1-bromo-4-methoxy-anthraquinone | orange |
| 12,4 | 1-chloro-3-acetyl-4-amino-anthraquinone | blue |
| 13,8 | 1-chloro-4-anilido-anthraquinone | blue |
| 14,5 | 1-chloro-5-phenylmercapto-anthraquinone | yellow |
| 14,8 | 2-chloro-3,4-phthaloylacridone | blue |
| 16,25 | 1-bromo-4-benzoylamino-anthraquinone | red |

EXAMPLE 3

2.22 g of 2,4-diamino-s-triazine and 11.4 parts of 1,3-dichloroanthraquinone are stirred in the presence of 5.3 parts of pulverised sodium carbonate, 1 part of copper (I) iodide and 3 parts of pyridine in 70 parts of nitrobenzene for 4 hours at 180°C–185°C. After the mixture has been colled to 80°C, the precipitated yellow dyestuff is filtered off and processed as described in Example 1. Yield: 12.2 parts of dyestuff of the formula

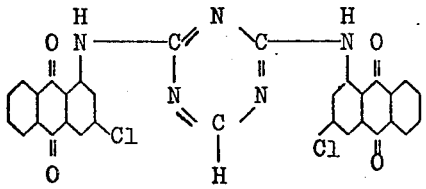

It dyes cotton from the vat in fast, brilliant greenish yellow shades. A dyestuff which dyes cotton from the vat in neutral yellow shades is obtained by substituting 11.4 parts of 1,6- or 1,7-dichloroanthraquinone for the 11.4 parts of 1,3-dichloroanthraquinone.

EXAMPLE 4

3 parts of 2,4-dichloro-s-triazine and 14.1 parts of 1-amino-4-benzoylaminoanthraquinone are stirred in 70 parts of o-dichlorobenzene in the presence of 2.5 parts of sodium carbonate for 2 hours at 145°–150°C and then for 2 hours under reflux. After the mixture has cooled, the precipitated dyestuff is filtered off, washed first with a small amount of o-dichlorobenzene, then thoroughly with methanol and water. The resulting dyestuff dyes cotton from a hydrosulphite vat in red shades which have excellent fastness to wet treatments and light.

In place of the 3 parts of 2,4-dichloro-s-triazine, it is possible with equal success to use 4.8 parts of 2,4-dibromo-s-triazine or 6.4 parts of 2,4-dibromo-s-triazine-hydrobromide. If the hydrobromide is used, it is expedient to increase the amount of sodium carbonate.

Dyeing Instruction I 1 part of dyestuff is vatted at 50°–70°C with 10 parts by volume of sodium hydroxide having a specific gravity of 36° Be and 5 parts of sodium hydrosulphite in 200 parts of water. The above stock vat is added to a dyebath which contains in 2000 parts of water 5 parts by volume of sodium hydroxide solution with a specific gravity of 36° Be and 3.7 parts of sodium hydrosulphite. 100 parts of cotton are put into this dyebath at 40°C. After 10 minutes, 15 parts of sodium chloride are added and after 20 minutes, a further 15 parts and dyeing is carried out for 45 minutes at 40°C. The cotton is then squeezed out, oxidised, and finished in the conventional manner.

Dyeing Instruction II 1 part of the dyestuff obtained according to Example 1 and 0.5 part of CI Disperse Yellow 84 are ground wet with 2.5 parts of a 50% aqueous solution of the sodium salt of dinaphthylmethane-disulphonic acid. A dyebath is prepared with this dyestuff preparation, 2 parts of ammonium sulphate, and 1000 parts of water, and the pH is adjusted to 6.0–6.9 with monosodium phosphate.

100 parts of a blended fabric of cotton/polyester (67% polyester) are put into this bath, which is heated to 120°–125°C over the course of 45 minutes. Dyeing is carried out at this temperature for 60 minutes in a sealed vessel. The dyebath is then cooled to 60°–70°C and 20 parts by volume of sodium hydroxide solution of Be 36° and 5 parts of sodium hydrosulphite are added. After 45 minutes, the fabric is squeezed out, oxidised, and finished in the usual manner. A blended fabric dyed yellow is obtained.

Pigment coloration 5 parts of the dyestuff mentioned in Example 1 are mixed with 95 parts of dioctyl phthalate and ground in a ball mill until the dyestuff particles are smaller than 3. 0.8 part of this dioctyl phthalate paste is mixed with 13 parts of polyvinyl chloride, 7 parts of dioctyl phthalate and 0.1 part of cadmium stearate, and this mixture is then rolled to and fro for 5 minutes in a twin roller mill at 140°C.

A yellow coloured material having good migration properties and good fastness to light is obtained.

Coloration of Lacquers a. Nitrocellulose lacquer 40 parts of a nitrocellulose lacquer, 2.375 parts of titanium dioxide and 0.125 part of the dyestuff of Example 1 were ground in a rod mill for 16 hours. The resulting lacquer is applied in a thin layer to aluminium foil. It gives a golden yellow coloration having excellent fastness to light.

b. 10 g of titanium dioxide and 2 g of the pigment manufactured according to Example 2 (No. 3 of the Table) are ground for 48 hours in a ball mill with a mixture consisting of 26.4 g of coconut alkyd resin, 24.0 g of melamineformaldehyde resin (50% solids content), 8.8 g of ethylene glycol monomethyl ether, 28.8 g of xylene.

By spraying this varnish on an aluminium sheet, drying it for 30 minutes at room temperature and then stoving it for 30 minutes at 120°C, there is obtained a clear red finish of good tinctorial strength which is characterised by good fastness to crosslacquering, outstanding fastness to light, and good resistance to weathering.

1. A vat dyestuff of the formula

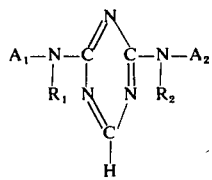

wherein each of $R_1$ and $R_2$ is independently hydrogen or lower alkyl, and each of $A_1$ and $A_2$ is independently anthraquinone unsubstituted or substituted by benzoylamino, halobenzoylamino, halogen, lower alkyl, lower alkoxy, lower alkanoyl, amino, phenylmercapto, or is phthaloylacridone.

2. A vat dyestuff according to claim 1, of the formula

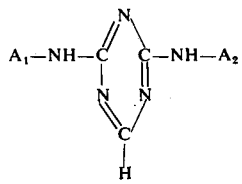

wherein each of $A_1$ and $A_2$ is independently anthraquinone bonded in the 1- or 2-position, unsubstituted or substituted by benzoylamino, chlorobenzoylamino, chloro, methyl, methoxy, acetyl, amino, phenylamino, phenylmercapto, or is 3,4-phthaloylacridone bonded in the 2- or 8-position.

3. A vat dyestuff according to claim 2, of the formula

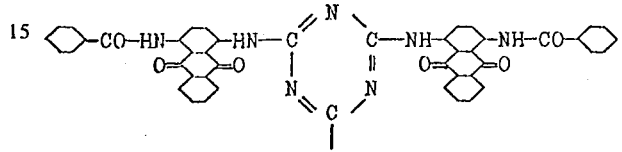

* * * * *